US008171487B2

(12) United States Patent
Buesing et al.

(10) Patent No.: US 8,171,487 B2
(45) Date of Patent: May 1, 2012

(54) METHOD FOR PROCESSING WORK ITEMS OF A WORKFLOW SYSTEM

(75) Inventors: Rainer Buesing, Stuttgart (DE); Christoph Peinert, Stuttgart (DE); Malte Randt, Jettingen (DE); Mathias Seifert, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 1038 days.

(21) Appl. No.: 12/110,650

(22) Filed: Apr. 28, 2008

(65) Prior Publication Data

US 2008/0276237 A1 Nov. 6, 2008

(30) Foreign Application Priority Data

May 2, 2007 (EP) .................................. 07107324

(51) Int. Cl.
*G06F 9/46* (2006.01)
*G06F 7/00* (2006.01)
*G06Q 40/00* (2006.01)
*G06Q 10/00* (2006.01)

(52) U.S. Cl. ........ 718/106; 707/694; 707/706; 707/707; 705/4; 705/7.26; 705/7.27

(58) Field of Classification Search .................. None
See application file for complete search history.

(56) References Cited

U.S. PATENT DOCUMENTS

| 5,887,151 A | 3/1999 | Raz et al. |
| 7,945,554 B2 * | 5/2011 | Dedhia et al. ............. 707/710 |
| 2005/0102299 A1 * | 5/2005 | Mair et al. ................. 707/100 |
| 2005/0204046 A1 * | 9/2005 | Watanabe ................... 709/228 |

FOREIGN PATENT DOCUMENTS

GB 2328764 * 3/1999

OTHER PUBLICATIONS

A New Prefetch Cache Scheme, Shun-Zheng Yu and Hisashi Kobayashi, 2000.
Prefetching Techniques for Client/Server, Object-Oriented Database Systems, Nils Knafla, PhD Dissertaion, University of Edinburgh, 1999.
Caching and Prefetching for Web Content Distribution, Jianliang Xu, Jiangchuan Lu, Bo Li, Xiaohua Jia, Computing in Science & Engineering, Jul./Aug. 2004.

* cited by examiner

*Primary Examiner* — Camquy Truong
(74) *Attorney, Agent, or Firm* — Schmeiser, Olsen & Watts; John Pivnichny

(57) ABSTRACT

A method for processing work items of a workflow system is done in the following manner. Information identifying work items from a server responsible for handling work items is retrieved based at least on a set of configuration rules. The information is stored in a cache. In response to a work item request form an application, matching work items are searched for in the cache, and a piece of information identifying the requested work item is delivered to the application in response to finding at least one work item matching the work item request from the application. Statistics on work item requests are maintained, and the set of configuration rules are modified according to the statistics.

16 Claims, 8 Drawing Sheets

METHOD FOR PROCESSING WORK ITEMS OF A WORKFLOW SYSTEM

CROSS-REFERENCE TO RELATED APPLICATIONS

This application claims priority from European Patent Application Number EP07107324.1 filed on May 2, 2007 and entitled METHOD FOR PROCESSING WORK ITEMS OF A WORKFLOW SYSTEM.

FIELD OF THE INVENTION

This invention relates generally to the field of data processing, and more particularly to a method for processing work items of a workflow system.

BACKGROUND OF THE INVENTION

In computer science, a work item is a piece of information defining a task or a set of related tasks to be carried out by a user or process. A workflow system is a data processing system for managing a flow of work items, typically in a distributed office environment. Typically, the workflow system has interfaces to various data stores which store documents to be processed and handled by the workflow system, and the workflow system provides these documents to the users when needed. A workflow system commonly contains at least a workflow modeling component (sometimes called specification module, design environment, or build time system) which enables administrators and analysts to define process and activities, analyze and simulate them, and assign them to people. A workflow system typically also contains a workflow execution component (sometimes called the runtime system) which most often consists of an execution interface seen by end-users and a workflow engine. The workflow engine is an execution environment which assists or performs the coordination of processes and activities.

As depicted in FIG. 1, most workflow systems provide a client/server architecture, that is, an application architecture in which an instance of a client software, for example, an application 100 using a graphical user interface, can send work item requests to a server, for example, a service or component 101 of the workflow system to deliver work items from an associated database 102. By a work item request is meant any request identifying at least one work item, for example, according to a set of selection criteria.

For instance, client applications may query the server to retrieve work items in a specific state, with specific properties for a specific user/group. This query is then transformed into native standard query language (SQL) queries against the server database. Because of the complex schema of this database, work item queries are often expensive and time consuming. This leads to sluggish responses on the client application.

An existing solution for improving responses to work item queries is the use of materialized views in the work item database 102. This solution is discussed in the IBM whitepaper "WebSphere Process Server V6—Business Process Choreographer: Performance Tuning of Human Workflows Using Materialized Views." The problem in using materialized views is that it depends on the query criteria whether it is possible to use materialized views. The processing of all work item queries is thus not made more efficient.

The invention that is presented here aims to address the response time problem in a manner that improves the processing of at least most of the queries.

SUMMARY OF THE INVENTION

Briefly stated, a method for processing work items of a workflow system is done in the following manner. Information identifying work items from a server responsible for handling work items is retrieved based at least on a set of configuration rules. The information is stored in a cache. In response to a work item request form an application, matching work items are searched for in the cache, and a piece of information identifying the requested work item is delivered to the application in response to finding at least one work item matching the work item request from the application. Statistics on work item requests are maintained, and the set of configuration rules are modified according to the statistics.

According to an embodiment of the invention, a computerized method for processing work items of a workflow system includes the steps of: (a) retrieving information identifying work items from a server responsible for handling work items based at least on a set of configuration rules; (b) storing the information in a cache; (c) searching for matching work items in the cache in response to a work item request from an application, the work item request specifying at least one criterion for work items; (d) delivering, in response to finding at least one work item matching the work item request, a piece of information identifying the at least one matching work item from the cache to the application; (e) maintaining statistics on work item requests; and (f) modifying the set of configuration rules according to the statistics.

According to an embodiment of the invention, a program storage device readable by a machine, tangibly embodying a program of instructions executable by a machine to perform method steps for processing work items of a workflow system, the method steps including (a) retrieving information identifying work items from a server responsible for handling work items based at least on a set of configuration rules; (b) storing the information in a cache; (c) searching for matching work items in the cache in response to a work item request from an application, the work item request specifying at least one criterion for work items; (d) delivering, in response to finding at least one work item matching the work item request, a piece of information identifying the at least one matching work item from the cache to the application; (e) maintaining statistics on work item requests; and (f) modifying the set of configuration rules according to the statistics.

According to an embodiment of the invention, a data processing system for caching work items includes a retrieval unit for retrieving information identifying work items from a server responsible for handling work items according to a set of configuration rules; cache memory for storing the information; a search unit for searching matching work items in the cache memory in response to a work item request from an application, the work item request specifying at least one criterion for work items; a delivery unit for delivering, in response to finding at least one work item matching the work item request, a piece of information identifying the at least one matching work item from the cache memory to the application; and a monitoring unit for maintaining statistics on the work item requests and for modifying the set of configuration rules according to the statistics.

According to an embodiment of the invention, a data processing system for caching work items includes means for retrieving information identifying work items from a server responsible for handling work items according to a set of configuration rules; memory means for caching the information; means for searching matching work items in the cache memory in response to a work item request from an application, the work item request specifying at least one criterion for work items; means for delivering, in response to finding at least one work item matching the work item request, a piece of information identifying the at least one matching work item from the cache memory to the application; and means for maintaining statistics on the work item requests and for modifying the set of configuration rules according to the statistics.

According to an embodiment of the invention, an article of manufacture including a computer useable medium having computer readable program code means embodied therein for processing work items of a workflow system, the computer readable program code means in the article of manufacture include (a) computer readable program code means for causing a computer to effect retrieving information identifying work items from a server responsible for handling work items according to a set of configuration rules; (b) computer readable program code means for causing the computer to effect caching the information; (c) computer readable program code means for causing the computer to effect searching matching work items in the cache memory in response to a work item request from an application, the work item request specifying at least one criterion for work items; (d) computer readable program code means for causing the computer to effect delivering, in response to finding at least one work item matching the work item request, a piece of information identifying the at least one matching work item from the cache memory to the application; and (e) computer readable program code means for causing the computer to effect maintaining statistics on the work item requests and for modifying the set of configuration rules according to the statistics.

DETAILED DESCRIPTION OF THE PREFERRED EMBODIMENT

The invention is applicable in any computer-based workflow system. The Background section above describes such workflow systems, and gives definitions for a workflow system and work item. IBM WebSphere Process server is an example of a workflow system.

In accordance with embodiments of the invention, a workflow system makes use of a cache for delivering work items from its associated database, serving as a backing store, to client applications.

The major benefit of embodiments of the invention is increased efficiency of fetching work items from a workflow system. This benefit is accomplished by caching work items expected to be used and adapting the caching rules continuously to the current usage statistics.

In computer science, a cache is a collection of data duplicating original values stored elsewhere or computed earlier, where the original data is typically expensive (usually in terms of access time) to fetch or compute compared to reading the cache. A cache may be considered to be a temporary storage area where typically frequently accessed data can be stored for rapid access. Once the data is stored in the cache, future use can be made by accessing the cached copy rather than re-fetching or recomputing the original data, so that the average access time is lower.

Operationally, a cache is a block of memory or storage for temporarily storing data likely to be used again. The central processing unit (CPU) and hard drive of a computer system frequently use a cache, as do web browsers.

A cache is made up of a pool of entries. Each entry typically has a datum (a piece of data) which is a copy of the datum in some backing store. Each entry also has a piece of information (for example, a reference), which specifies the identity of the datum in the backing store of which the entry is a copy.

Figure 1:
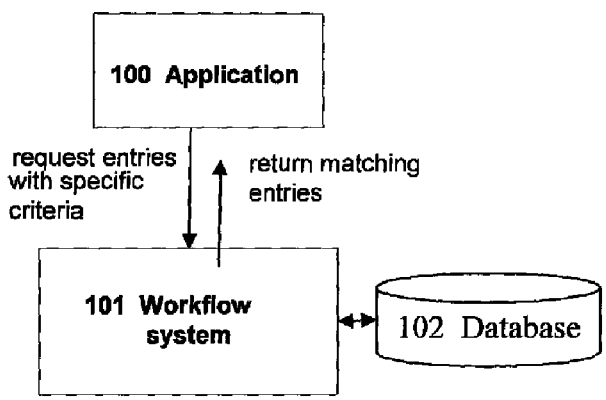
FIG. 1 shows a block diagram of a conventional workflow system database and application according to the prior art.
Figure 2:
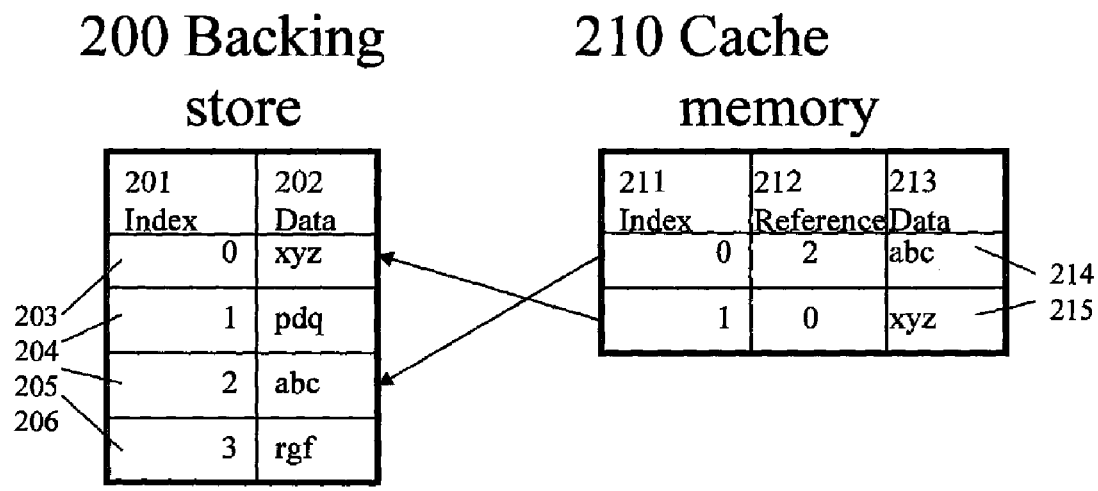
FIG. 2 shows an example of a cache and associated backing store according to the prior art.

As an example, refer to the setup depicted in FIG. 2. Backing store 200 contains a list of entries 203 through 206, each composed of an index 201 and corresponding datum 202. A cache 210 associated with the backing store 200 stores duplicates 214 and 215 of the entries 203 and 205, respectively, of the backing store 200. These entries 214 and 215 of the cache 210 are each composed of an index 211, a reference 212, and a datum 213, wherein the reference 212 is used to link each cache entry 214 and 215 to its corresponding backing store entry 203 or 205, respectively, by storing the index value of that respective backing store entry. Use of the cache 200 can be made by accessing the cached copies 214 or 215 rather than fetching the original entries 203 or 205, resulting in a reduced access time for the user.

Generally, when the cache client (for example, CPU, web browser, operating system) wishes to access a datum presumably in the backing store, it first checks the cache. If the desired datum is found in the cache, the cached datum is used. This situation is known as a cache hit. In this example, the URL is the tag, and the contents of the web page is the datum. The percentage of accesses that result in cache hits is known as the hit rate or hit ratio of the cache.

Figure 3:
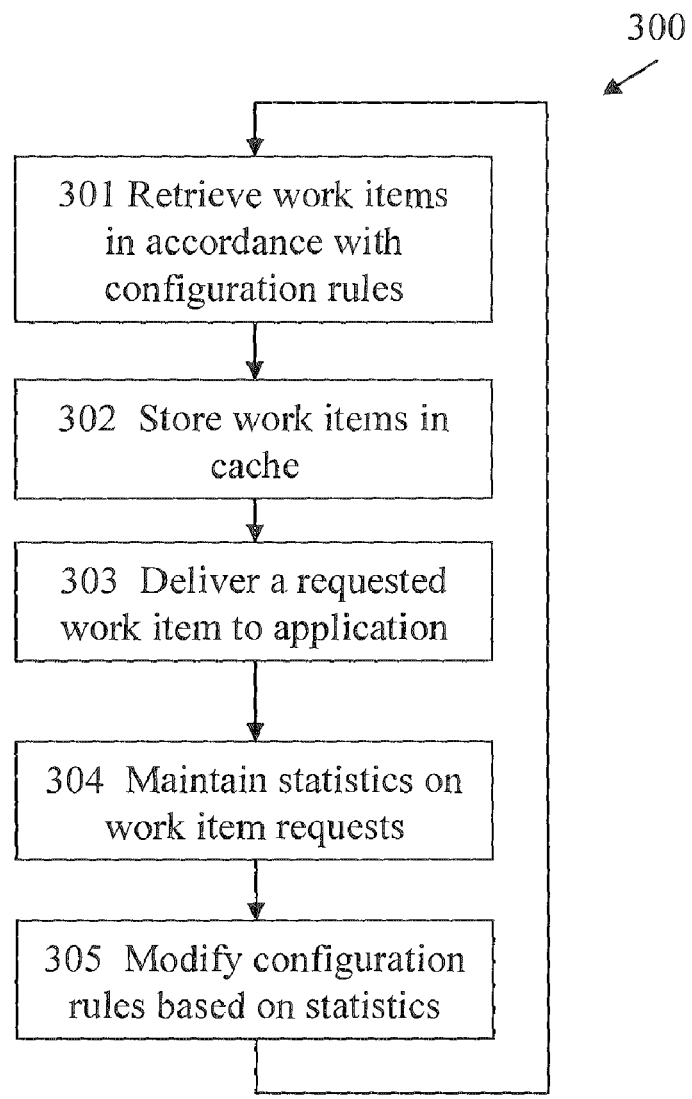
FIG. 3 shows a flowchart of a method according to an embodiment of the invention.

The invention is elucidated by reference to an embodiment in conjunction with FIG. 3. In step 301, information identifying work items is retrieved from a workflow system database server responsible for handling work items according to a set of configuration rules. Details of the configuration rules are discussed in connection with FIG. 8. In step 302, the retrieved information on work items is stored in a cache structure that is separate from the workflow system database. In step 303, in response to finding work items matching a work item request from a client application, a piece of information identifying the matching work item(s) stored in the cache is delivered from the cache to the requesting application. In step 304, usage statistics on work item requests are maintained which, in step 305, serve as a basis to modify or update the configuration rules. All of the steps according to FIG. 3, especially the delivery of information identifying work items to an application in step 303, may use mere references to the actual work items or explicit descriptions of the work items. A piece of information identifying a work item may thus be a reference to a work item or a description of the work item itself. The options are discussed in more detail in connection with FIG. 4.

The work items may be assigned a work item type from a set of allowable types for ease of identification. The work item request issued in step 303 by the application would then typically indicate the type of the requested work item, for example, by specifying a set of selection criteria. The statistics maintained in step 304 and used in step 305 would typically include, for each of the allowable types of work items, a rate of requests for work items of that respective type. This rate would typically form the basis at which the respective cache bucket must be replenished by retrieving work items from the server in step 301. (The cache is an internal data structure consisting of a number of buckets.)

When handling work items, each work item is typically fetched from the server only once. Therefore the caching of work items is typically depletive. Thus, work items delivered to an application from the cache in step 303 are typically removed from the cache. Work item requests would thus effectively deplete the cache buckets, necessitating their replenishment in step 301.

As an example, the selection criteria specified by the application as part of work item requests might include information such as the identification of a user responsible for carrying out the task represented by that work item, identification of a user who originated that task, or a categorization of the task.

It is appreciated that the flowchart in FIG. 3 is just one example. It is possible that the number and order of steps is different in other methods in accordance with the invention.

Figure 4:
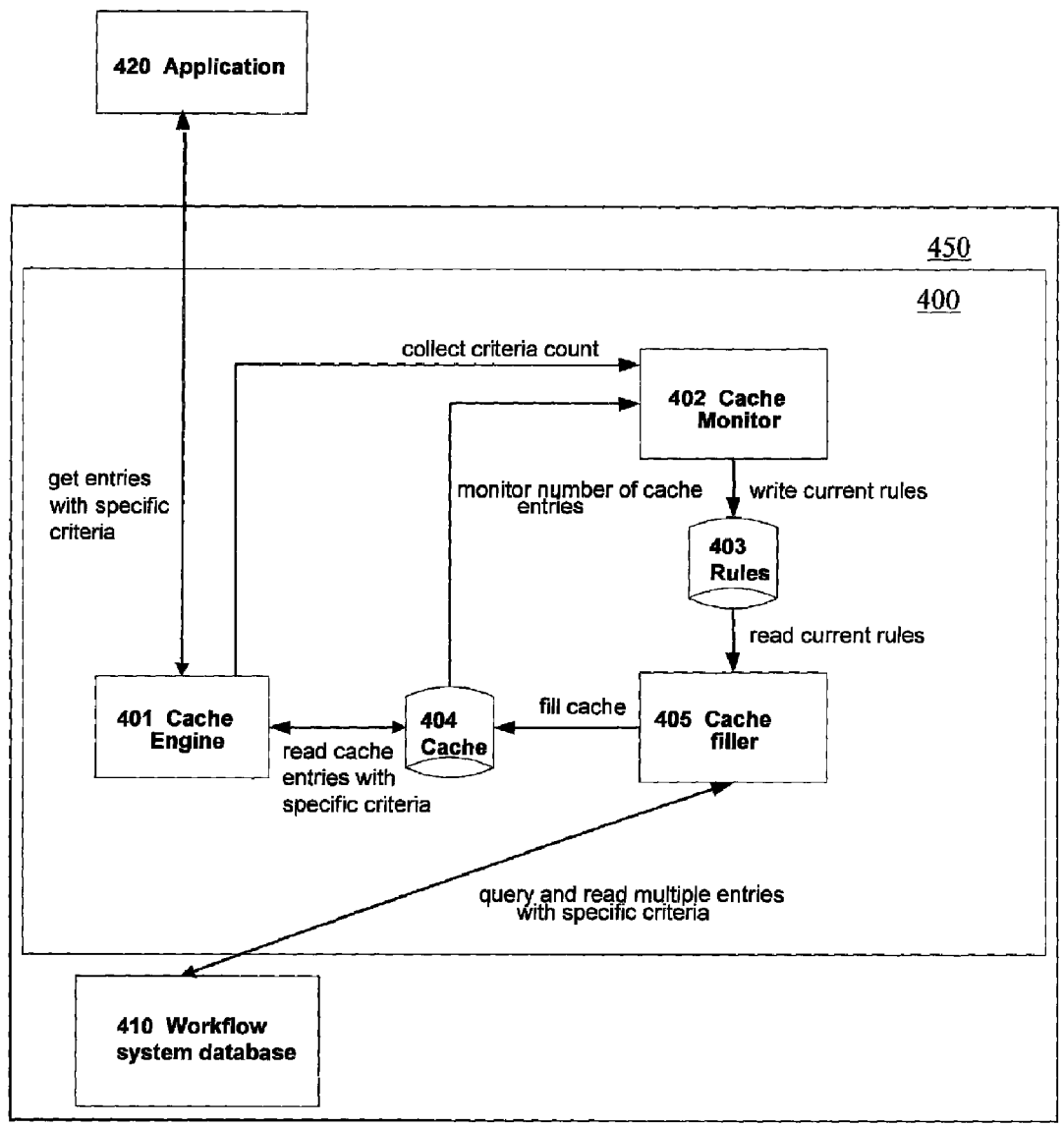
FIG. 4 shows a block diagram of a software architecture according to the present invention.

FIG. 4 shows, as an example, a block diagram of the components of a system or device according to an embodiment of the invention. The figure shows a caching system 400 as part of a workflow management system 450. The caching system 400 may be separate from the workflow management system 450 or it may form a part of the workflow management system 450.

The cache 404 is an internal data structure consisting of a number of buckets. Each of the buckets holds a certain kind of work items. The number of buckets and their size is defined by the configuration rules 403. The configuration rules 403 are read by the cache filler 405 which will then build up the cache structure accordingly. The rules define what kind of work items the cache 404 will be populated with, which queries are used against the database API to retrieve those work items, what the initial, minimum and maximum bucket size for each task type will be and at what frequency the cache filler 405 should query for new work items of a certain type.

The cache engine 401 retrieves cache items from a specific cache bucket which is identified by a set of criteria values. It provides the interface to which the client application 420 connects. It also collects statistical data for each cache bucket, including the current size of each cache bucket, the average frequency in which work items are requested from a cache bucket, and whether or not a cache bucket has run empty since the last update of the configuration rules 403. The statistical data is passed to the cache monitor 402, which will analyze the values and potentially recalculate the configuration rules 403. The cache engine 401 depends on the data structure used to implement the cache 404 to efficiently select the queue which represents the desired cache bucket.

As is depicted here, a cache engine 401 receives requests for work items from at least one client application 420, delivers those work items from the cache and sends usage statistics to a cache monitor 402. The cache monitor 402 monitors the queries that are made to the cache structures 404 to generate statistics on the use and contents of the cache buckets, or containers, to determine when a bucket has to be refilled. At start-up, the cache monitor 402 reads the initial set of configuration rules 403 and modifies them according to the cache's usage. A cache filler 405 is the component that queries the workflow system database 410 to refill the cache buckets. From the configuration rules 403, the cache filler 405 determines the queries it has to use to access the workflow system database 410. The cache filler 405 will be triggered by the cache monitor 402 to refill a bucket once its size shrinks below the configured minimum.

When caching work item references, at a later processing stage, the application 420 can then retrieve the work item descriptions from the workflow system database using the references. The workload imposed on a conventional workflow system 101 and its database 102 through queries, i.e., requested searches for work items based on one or more criteria, by an application 100 will thus be significantly reduced, resulting in an increased overall performance of the workflow system 450.

Since both the references to work items and the actual work items will be retrieved from the workflow system database 410 using standard interfaces, the workflow system database 410 does not need to be changed. From the perspective of the workflow system database 410, the cache 400 is transparent; from the perspective of the application 420, the cache 400 is typically not transparent. The application 420 may thus need to be changed when introducing a caching mechanism according to an embodiment of the invention. These changes are relatively simple. Basically, instead of requesting a set of work items from workflow system database 410, the application 420 sends the work item request to the cache engine 401. The required logic could also be encapsulated by an abstraction layer, which would ease the implementation of applications 420 using the cache 400. To reduce complexity, the cache engine 401 can easily implement the interface of the workflow system database 410 and forward all method invocations to the workflow system database 410. Only the work item queries it would perform on its own. Thus the application 420 has to interface with one component only.

Also the interface of the workflow system database 410 may dictate this two-step approach. The interface typically does not allow to query a work item and interact with this work item at the same time (e.g. claim the work item that matches a given query). The application 420 typically needs to at first run a query to obtain a reference to a work item and then, using this reference, the application can use the interface to interact with the work item.

If the cache 400 only holds references to work items, assuming that the criteria (category, type of task, etc.) of work items do not change, no changes need to be reflected in the cache 400. If a work item is completely deleted from the workflow system database 410, the cache 400 would contain a dead reference. However, in this case the requesting application 420 would simply request another work item. Each application 420 working with the workflow system database (either through cache 400 or directly) should typically be aware of this possibility. Even after a direct query of the workflow system database 410, there is no guarantee that the returned work items are still available when the application 420 wants to interact with them.

When explicit descriptions of the work items are cached, the workflow system database 410 may need to specifically support the caching of these descriptions. This may be necessary because fetching the work item generally involves two-way communication, for example, to change the state of the work item in the workflow system database 410 (check out an item). For very simple workflow systems 450 without support for checking out or reserving items, no specific adaptation may be required to introduce a cache 400 according to an embodiment of the invention.

Typically, the configuration of the application 420 has to be changed at least to address the cache engine 401 instead of the workflow system database 410 when sending work item requests. In addition, the work item requests that are issued by the application 420 have to match the ones defined in the configuration rules 403. So generally, either the application 420 has to be changed to adapt to the configuration rules 403, or (preferably) the configuration rules 403 have to support the queries that are issued by the application 420. A caching mechanism according to an embodiment of the invention might even apply a self-learning approach here to enable the cache 400 to automatically adapt to different queries run by the workflow application 410, but the benefit of waiving the initial design of the configuration rules 403 would typically not justify the added complexity of this approach.

The cache filler 405 is responsible for building the initial cache 404, filling each cache bucket with an initial set of cache items and refilling the cache buckets based on the configuration rules 403 throughout the lifecycle of the cache 404. The cache filler 405 also includes the interface to the underlying workflow system database 410. In this exemplary embodiment invention, the cache filler 405 is the only component which connects directly to the workflow system database 410.

For initializing the cache 404 and filling it with the initial set of cache items, the cache filler 405 reads the following parameters from the configuration rules 403: dimension of criteria (count of criteria), cardinality of each criterion (number of distinct values), possible values for each criterion, and initial size for each cache bucket. The cache filler 405 first builds the structure of the cache 404 and creates the work item queues representing the cache buckets. Afterwards it retrieves cache items from the workflow system database 410 to fill each bucket to its initial size as defined by the configuration rules 403. Once the cache 404 is initialized, regular operation begins. During the lifecycle of the cache 404, each cache bucket may need to be refilled. The point in time when the next refill has to be performed is calculated based on the fill rate which is contained in the configuration rules 403. The configuration rules 403 also define how many new cache items are to be inserted into the cache bucket with each refill; these numbers may differ among the cache buckets. For refilling the cache 404, the fill rate and number of cache items to enqueue during the refill are read from the configuration rules 403.

The configuration rules 403 define the items that are to be cached, which attributes they are defined by, the size of the buckets they have to be cached in and the query against the workflow system database 410 that is needed to retrieve them.

The cache 404 consists of several cache buckets. Each of these buckets is uniquely identified by one or more attributes, which are here called cache criteria. A cache criterion might be the category of a work item, for example, "change of address" or "termination of contract." The dimension of criteria (count of criteria) and their cardinality (number of distinct values for that criterion) determine the number of cache buckets required.

The number of cache buckets required is:

$$N = \prod_{i=0}^{n} C_i$$

where i is the index of criteria and $C_i$ is the cardinality of the specific criterion i. In this exemplary embodiment of the invention, each cache bucket is implemented as an independent first-in first-out (FIFO) queue. In most cases, workflow systems aim to process work items in accordance with the order in which they were created. Therefore the cache buckets are often implemented as queues.

Figure 5:
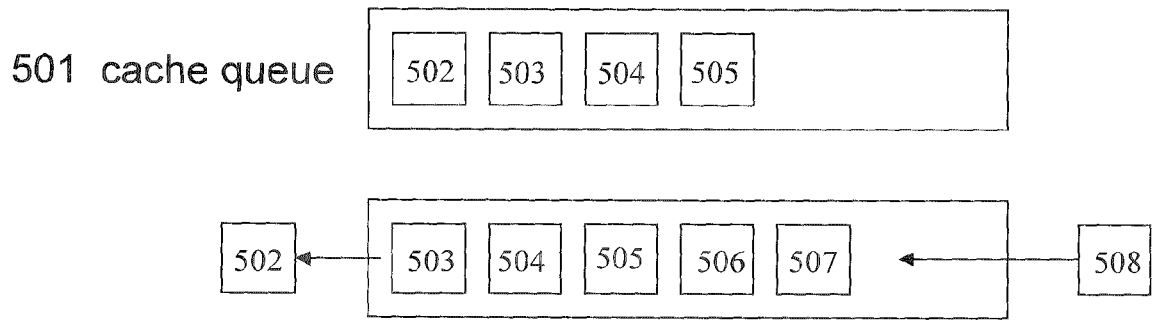
FIG. 5 shows a queue implementation of cache buckets.

FIG. 5 shows a queue implementation of cache buckets. Cache queue 501 contains a plurality of work items 502 to 505. Eventually, the cache engine removes ("dequeues") work item 502 from the queue. According to its set of configuration rules, the cache filler refills the queue by adding ("enqueueing") new work items 506 to 508.

In order to achieve an adequate performance, it is crucial to efficiently find and address cache queues depending on given criteria values. Therefore, the data structure which is used to manage the cache queues should be efficiently searchable. During the initialization of the cache, the cache structure can be built based on the following information provided by the configuration rules 403: dimension of criteria (count of criteria), cardinality of each criterion (number of distinct values), and possible values for each criterion. The type of data structure to be used to maintain the cache queues depends heavily on these parameters. Depending on the data types of the criteria values, several data structures may not be applicable.

While the implementation of a satisfying data structure to represent a cache 404 with only one criterion is relatively simple and can be achieved by using a list, a hash table or a tree structure, having several dimensions significantly increases the number of cache queues and selecting the desired queue becomes an issue.

Figure 6:
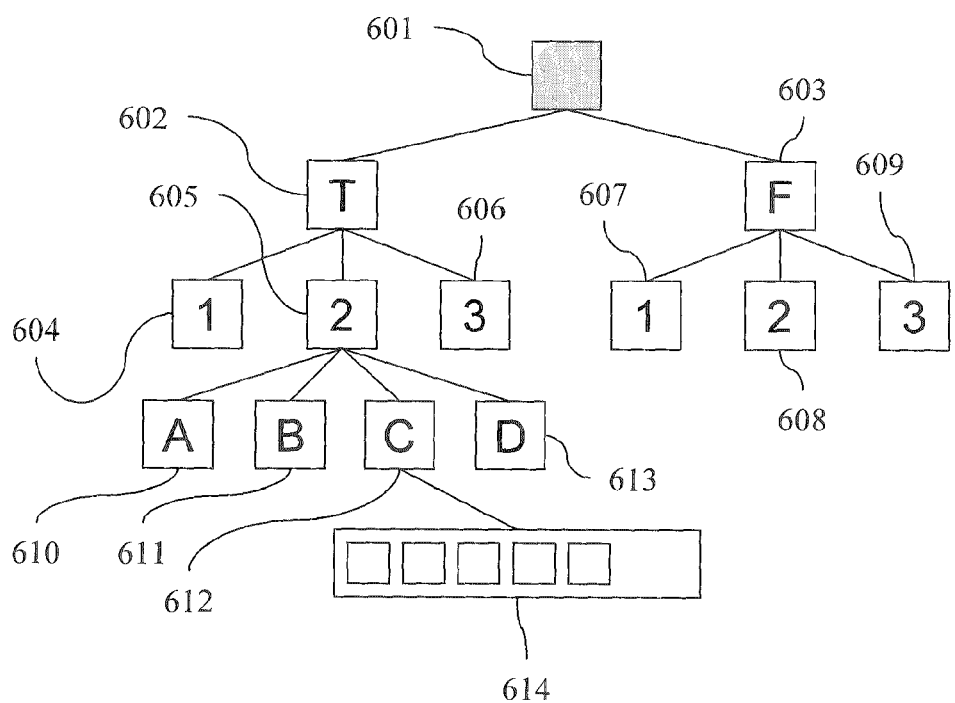
FIG. 6 shows a cache queue selection tree.

FIG. 6 shows a cache queue selection tree, that is, a structure for organizing the queues which represent cache buckets. The purpose of the cache queue selection tree is to efficiently select a cache queue depending on the given cache criteria.

The tree structure allows for efficient selection of a specific queue in situations that are found in real-life environments. These real-life environments are denoted by: moderate dimension of criteria (usually one to three, significantly below ten); different cardinality for the different criteria (one criterion has only few possible values, another one has many); static dimension, cardinality and criteria values (at least for the lifetime of the cache).

Each level of the tree (horizontal) corresponds to one criterion. Criteria with a lower cardinality should be the parent nodes of criteria with higher cardinality for performance reasons. The cache queues are stored as leafs of the tree, which means on the lowest level.

Please note that FIG. 6 is a simplified drawing which does not show all descendants of the nodes. In an actual implementation, each of the nodes 609 through 612 would reference a cache queue 614 on the leaf level. Also, each of the nodes on the criterion 2 level (nodes 604 through 609) would reference a similar sub-tree as depicted for node 605.

Taking the cache tree depicted in FIG. 6 as an example, node 601 is the root node of the queue selection tree. It has no semantic meaning but is required as the root element of the tree which contains the references to its child nodes. Nodes 602 and 603 are on the same hierarchical level. This level represents a cache criterion. In this example the cardinality of the criterion is 2, the data type is Boolean and therefore the only allowed values are "T" (true) and "F" (false). Upon queue selection, this criterion would be evaluated first. Afterwards only one of the sub-trees (descendants of either node 602 or node 603) would be regarded for further evaluation. Similar to nodes 602 and 603, the nodes 604 through 609 represent another cache criterion since they are on the same level. In this example the cardinality of the criterion is 3, the data type is numeric and in this case three values are valid ("1", "2" and "3"). As described for node 602, only one sub-tree will be regarded depending on the evaluation of the first criterion.

As an example, if criterion 1 is "true", the nodes 604 through 606 will be used; if criterion 1 is "false", nodes 607 through 609 will be evaluated. Please note that all nodes on this level (604 through 609) do reference a sub-tree similar to the one referenced by node 605 in the FIG. 6. For simplification, these descendants are not depicted.

Nodes 610 through 613 represent another cache criterion. In this case, the cardinality of the criterion is 4, the data type is "character" and four values are valid ("A", "B", "C" and "D").

This sub-tree (nodes 610 through 613) will only be evaluated if criterion 1 is "true" and criterion 2 is "2".

Node 612 references cache queue 614. If the criteria evaluation leads to this node, the referenced cache queue will be selected. The cache queue 614 is stored as a leaf of the queue selection tree. Cache queues are the data structures used to represent cache buckets. They are implemented as first-in first-out queues; this means they retain the order of cache items contained. The total number of cache queues depends on the number and cardinality of the cache criteria.

As an example of a semantic interpretation of criteria, the criterion represented by nodes 602 and 603 might indicate if the system user who originated a work item is flagged as being a manager. The criterion represented by nodes 604 through 609 might indicate a category of the task represented by the work item. Finally, the criterion represented by nodes 610 through 613 might indicate a sub-category of that task. If, as an example, the cache queue selection tree depicted in FIG. 6 is queried for a work item originated by a managing user and associated with a task of category "2" and sub-category "C", that query might be evaluated to return the first work item contained in cache queue 614.

Figure 7:
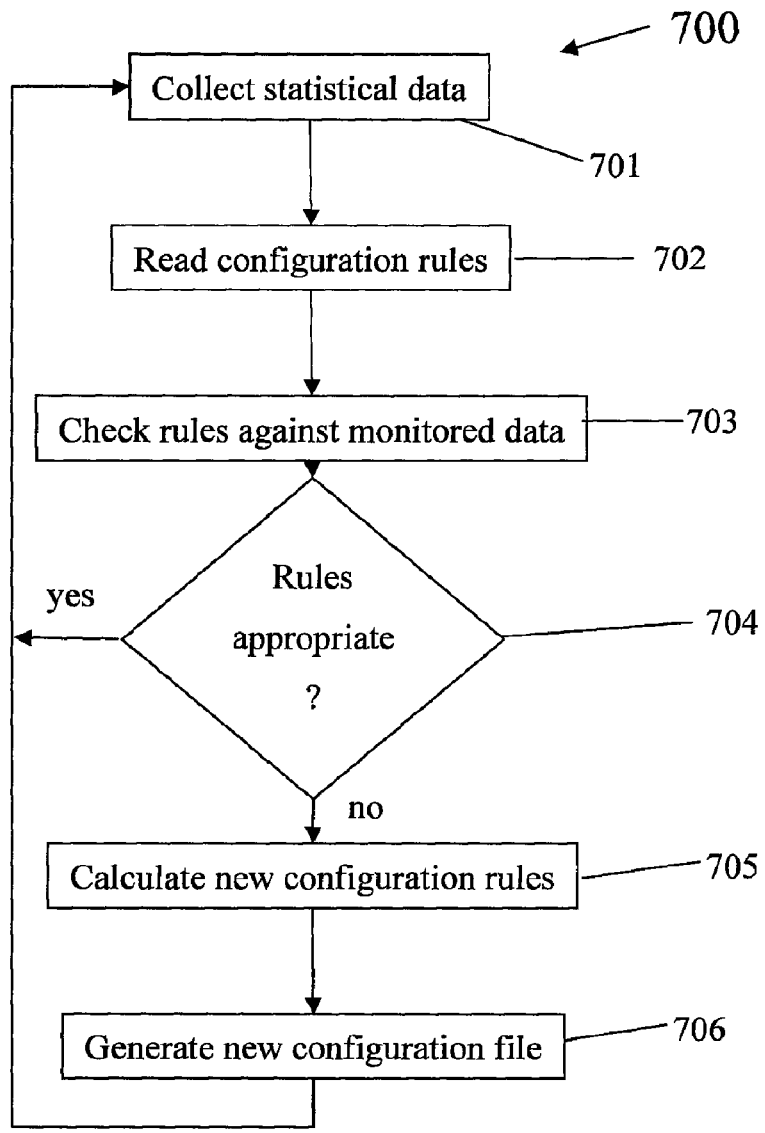
FIG. 7 shows a flowchart of the process performed by a cache monitor according to an embodiment of the invention.

FIG. 7 shows a flowchart of the process performed by a cache monitor according to an embodiment of the invention. In step 701, the cache monitor 402 monitors the queries that are made to the cache 404 to collect statistical data. It monitors the cache 404 over a certain period of time to acquire statistical usage data.

In step 702, the cache monitor 402 reads the configuration rules 403 (FIG. 4). In step 703, by comparing the configuration rules 403 to the acquired statistics, the cache monitor 402 (FIG. 4) determines necessary adjustments to the configuration rules 403. Based on these required adjustments, the cache monitor 402 will modify the configuration rules 403 according to the usage of the cache 404 (FIG. 4).

The cache monitor 402 collects statistical data by monitoring the queries for each work item type over a certain period of time and calculating the retrieval frequency for each work item type. As an example, assuming that statistical data is acquired over a period of 10 minutes, 32 queries may be counted in that period for work items of type 1, 57 queries for work items of type 2, and 50 queries for work items of type 3. The resulting retrieval frequency would then yield 3.2 queries per minute for work items of type 1, 5.7 queries per minute for work items of type 2, and 5 queries per minute for work items of type 3.

In step 704, the cache monitor 402 then compares the calculated statistics with the current set of configuration rules 403 that may be stored, for example, in a local configuration file. Assuming that, for the given example, a fill rate of 5 work items per minute is configured for each work item type, the cache monitor 402 might determine that the fill rate is too high for work items of type 1, too low for work items of type 2, and appropriate for work items of type 3.

In step 705, the cache monitor 402 then adapts the current configuration rules 403 to account for the observed deviations. In the given example, it may change the fill rate for work items of type 1 to 4 queries per minute and for work items of type 2 to 6 queries per minute. Similar updates may be performed to the minimum and maximum cache size and other configuration rules.

In step 706, if the configuration rules 403 are stored in a local configuration file, the cache monitor 402 then writes the updated configuration rules 403 to that file.

Figure 8:
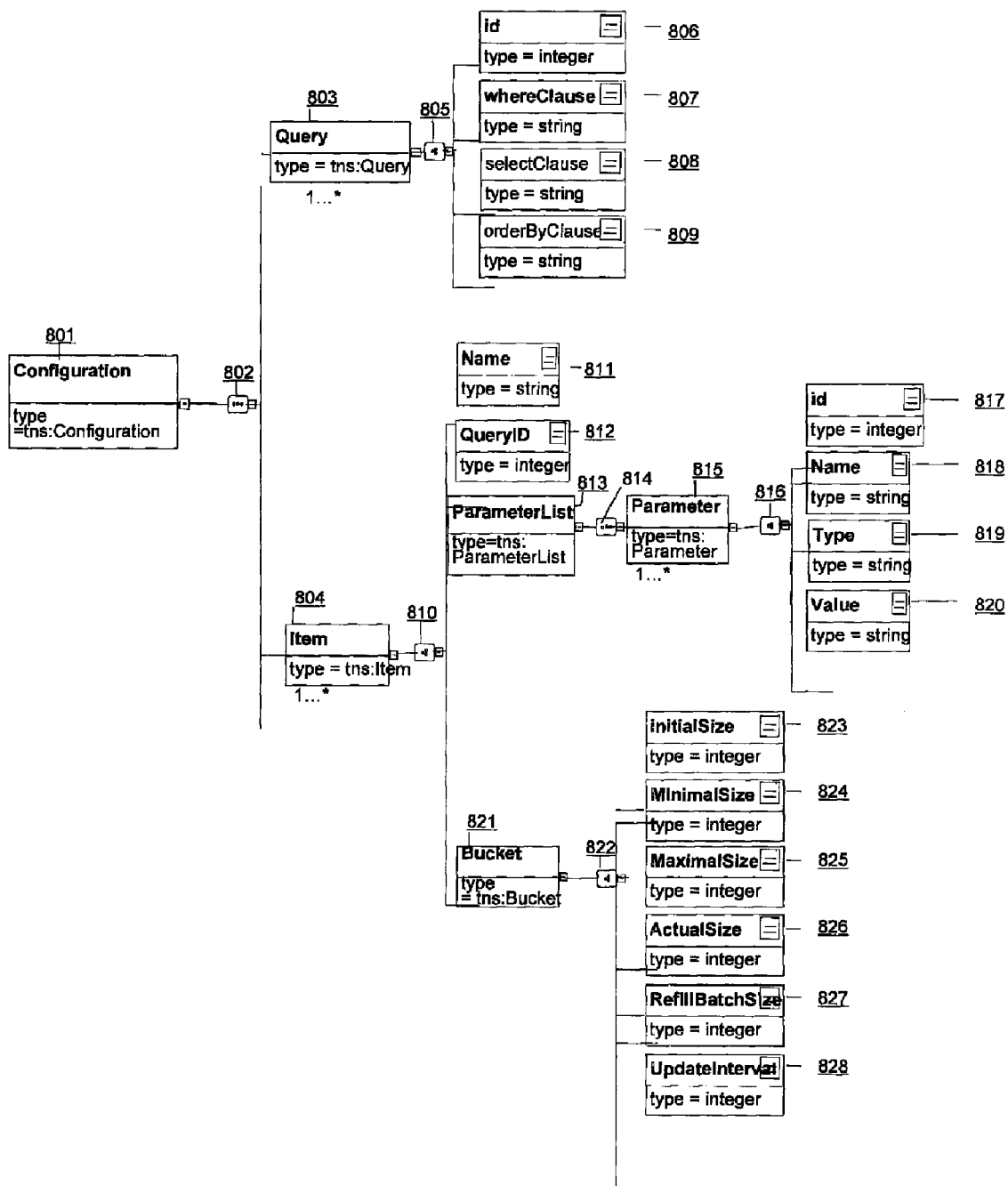
FIG. 8 shows an XML schema describing the configuration rules in a system according to an embodiment of the invention.

FIG. 8 shows an XML schema describing the configuration rules in a system according to an embodiment of the invention. Here, the "Configuration" element 801 is the root element of the configuration rules and serves as a container for all further elements.

Contained within the "Configuration" element 801, one or more "Query" elements 803 may be used to define possible queries against the workflow system database. A query is composed of a "selectClause" 807, "whereClause" 808, and "orderByClause" 809, together constituting a Standard Query Language (SQL) query string. Each "Query" element is uniquely identified by its "id" element 806.

Also contained within the "Configuration" element 801, one or more "Item" elements 804 may be used to define work item types along with their configuration parameters. Here, a "Name" element 811 holds a unique identifier for the work item type and "QueryID" 812 refers to a query template used to retrieve work items of this type. Also contained within the "Item" element 804, a "ParameterList" element 813 comprising one or more "Parameter" elements 815, each composed of an "id" 817, "Name" 818, "Type" 819, and "Value" 820, defines the work item type by its attributes, whose values can then be used at runtime to identify the type of a given work item.

Also contained within the "Item" element 804, a "Bucket" element 821 defines the cache bucket to be used for work items of the respective type. In other words, the "Bucket" element 821 defines the configuration rule for one cache bucket. This cache bucket is defined by: an initial size ("InitialSize" element 823); a minimum size ("MinimalSize" element 824); a maximum size ("MaximalSize" element 825); a current size ("ActualSize" element 826); a number of items to be retrieved at once to refill the bucket ("RefillBatchSize" element 827); and a refill rate at which new items are retrieved to refill the bucket ("UpdateInterval" element 828).

The "sequence" compositors 802, 814 that connect, for example, the "Configuration" element 801 with the "Query" element 803 and "Item" element 804 indicate that, in a conforming XML document, element 801 must contain, in sequence, elements 803 and 804. The "all" compositors 805, 810, 816, 822 that connect, for example, the "Query" element 803 with the "id" element 806, the "whereClause" element 807, the "selectClause" element 808, and the "orderByClause" 809, indicate that, in a conforming XML document, the "Query" element 803 must be followed by all of the elements 806 to 809.

Figure 9:
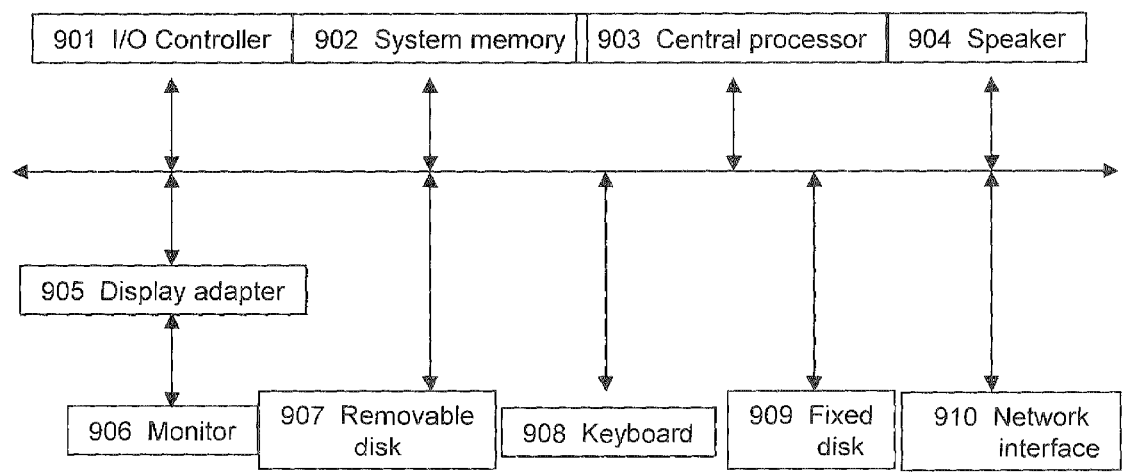
FIG. 9 shows a system block diagram of a typical computer system used to execute the software of the present invention.

FIG. 9 shows a system block diagram of a computer system used to execute the software of the present invention. The computer system according to FIG. 9 includes subsystems such as a central processor 903, a system memory 902, an I/O controller 901, a display adapter 905, a removable disk 907 (e.g., CD-ROM drive), a fixed disk 909, a network interface 910, a monitor 906, a keyboard 908, and a speaker 904. Other computer systems suitable for use with the present invention may include additional or fewer subsystems. For example, another computer system could include more than once processor 903 (i.e., a multi-processor system) or a cache memory.

Figure 10:
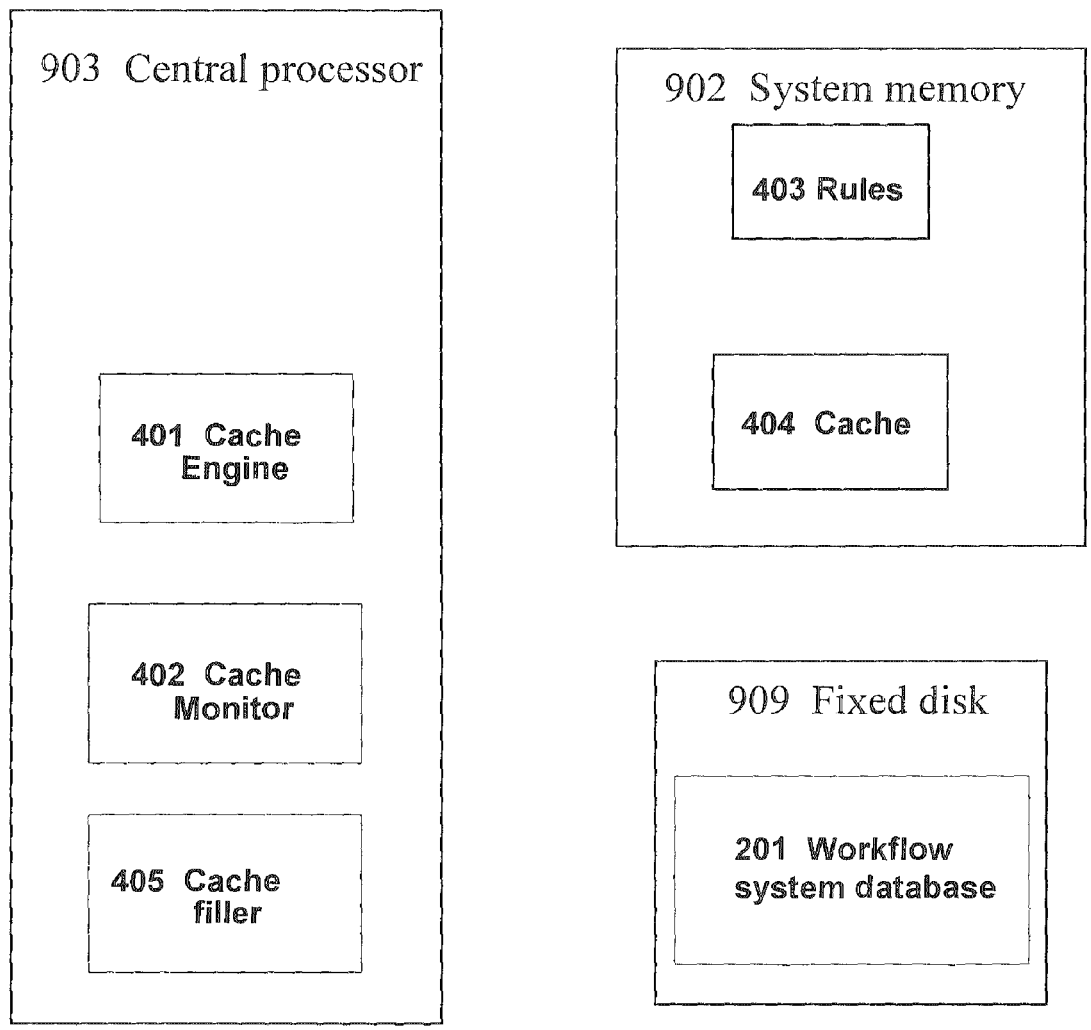
FIG. 10 shows a system block diagram of a typical configuration of the software of the present invention.

FIG. 10 shows a system block diagram of a configuration of the software of the present invention. Here, the cache engine 401, cache monitor 402, and cache filler 405 are all executed on the same central processor 903 (FIG. 9). It is appreciated that some or all of these components could be executed on separate processors. The configuration rules 403 and cache structures 404 are both stored in system memory 902 (FIG. 9). If the cache program is running on the same computing system as the workflow management system, the workflow system database 410 is stored on the fixed disk 909 (FIG. 9). It is appreciated that the cache structures 404 could be stored in system memory or on alternate media like, for example, magnetic disks or tape devices. Even fetching the cached work items from a fixed disk may be faster than fetching them from a separate work item database. Also, the configuration rules 403 or other components could be stored in system memory or on alternate media like, for example, magnetic disks or tape devices.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It is appreciated that although embodiments of the invention have been discussed on the assumption that a client/server architecture is used as an application architecture, this is not to be considered a restriction. It is possible to apply the same method to any other application architecture.

It is appreciated that although embodiments of the invention have been discussed where only a single application requests work items from the cache, this is not to be considered mandatory. It is possible to apply the same method to a software architecture involving a plurality of applications connected to the workflow system.

This description explicitly describes some combinations of the various features discussed herein. It is appreciated that various other combinations are evident to a skilled person studying this description.

In the appended claims a method in a computer refers to a method whose steps are performed by a computing system containing a suitable combination of one or more processors, memory means, and storage means.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A computerized method for processing work items of a workflow system, said method comprising:
retrieving, by a processor of a computer system, information identifying work items from a server responsible for handling work items based at least on a set of configuration rules;
said processor storing said information in a cache; said processor searching for matching work items in said cache in response to a work item request from an application, said work item request specifying at least one criterion for said work items;
said processor delivering, in response to finding at least one work item matching said work item request, a piece of information identifying said at least one matching work item from said cache to said application;
said processor maintaining statistics on said work item request; and said processor modifying said set of configuration rules according to said statistics;
said method further comprising providing a set of allowable types of work items, wherein said work item request indicates a type of the requested work item, wherein said cache comprises a plurality of containers, and wherein said method further comprises storing said information identifying work items of one of said allowable types in a respective container;
wherein said providing the set of allowable types of work items comprises providing n+1 criteria such that n is at least 2 and further providing a cardinality $C_i$ of criterion i for all integer values i from i=0 through i=n, wherein $C_o$=1, wherein $C_i$ is at least 2 for i=1 through i=n, wherein each allowable type of work item is a unique combination of one value of each $C_i$, from i=0 through i=n, and wherein the plurality of containers consist of N containers such that N is a product over $C_i$, from i=0 through i=n.

2. The method according of claim 1, wherein said piece of information comprises at least one description of a matching work item.

3. The method of claim 1, wherein said set of configuration rules comprises at least one of the following:
a minimum number of work items for which said information is to be stored in each of said containers;
a maximum number of work items for which said information is to be stored in each of said containers; and
instructions for a temporal distribution of retrievals of said information from said server.

4. The method of claim 3, wherein said maintaining statistics further includes maintaining, for each of said allowable types, at least a rate of work item requests of the respective type as said statistics.

5. The method of claim 4, said method further comprising removing said piece of information from said cache after delivery to said application.

6. The method of claim 1, wherein the method further comprises generating a cache selection tree as a hierarchy comprising levels 0, 1, ..., n, n+1, wherein level i comprises $C_i$ nodes representing criteria i for i=0 through i=n, and wherein level n+1 comprises leaf nodes of the tree such that each leaf node at level n+1 is a unique container of the N containers.

7. A program storage device readable by a machine, said program storage device storing therein a program of instructions executable by a processor of a computer system to perform a method for processing work items of a workflow system, said method steps comprising:
   said processor retrieving information identifying work items from a server responsible for handling work items based at least on a set of configuration rules; said processor storing said information in a cache;
   said processor searching for matching work items in said cache in response to a work item request from an application, said work item request specifying at least one criterion for said work items;
   said processor delivering, in response to finding at least one work item matching said work item request, a piece of information identifying said at least one matching work item from said cache to said application;
   said processor maintaining statistics on said work item requests; and
   said processor modifying said set of configuration rules according to said statistics;
   said method further comprising providing a set of allowable types of work items, wherein said work item request indicates a type of the requested work item, wherein said cache comprises a plurality of containers, and wherein said method further comprises storing said information identifying work items of one of said allowable types in a respective container;
   wherein said providing the set of allowable types of work items comprises providing n+1 criteria such that n is at least 2 and further providing a cardinality $C_i$ of criterion i for all integer values i from i=0 through i=n, wherein $C_o=1$, wherein $C_i$ is at least 2 for i=1 through i=n, wherein each allowable type of work item is a unique combination of one value of each $C_i$, from i=0 through i=n, and wherein the plurality of containers consist of N containers such that N is a product over $C_i$, from i=0 through i=n.

8. The program storage device of claim 7, wherein said piece of information comprises at least one description of a matching work item.

9. The program storage device of claim 7, wherein said set of configuration rules comprises at least one of the following:
   a minimum number of work items for which said information is to be stored in each of said containers;
   a maximum number of work items for which said information is to be stored in each of said containers; and
   instructions for a temporal distribution of retrievals of said information from said server.

10. The program storage device of claim 9, wherein said maintaining statistics further includes maintaining, for each of said allowable types, at least a rate of work item requests of the respective type as said statistics.

11. The program storage device of claim 7, wherein the method further comprises generating a cache selection tree as a hierarchy comprising levels 0, 1, ..., n, n+1, wherein level i comprises $C_i$ nodes representing criteria i for i=0 through i=n, and wherein level n+1 comprises leaf nodes of the tree such that each leaf node at level n+1 is a unique container of the N containers.

12. A computer system comprising a processor, a memory, and a computer storage device, said storage device storing program code configured to be executed by the processor via the memory to implement a method for processing work items of a workflow system, said method comprising:
   said processor retrieving information identifying work items from a server responsible for handling work items based at least on a set of configuration rules; said processor storing said information in a cache;
   said processor searching for matching work items in said cache in response to a work item request from an application, said work item request specifying at least one criterion for said work items;
   said processor delivering, in response to finding at least one work item matching said work item request, a piece of information identifying said at least one matching work item from said cache to said application;
   said processor maintaining statistics on said work item requests; and
   said processor modifying said set of configuration rules according to said statistics;
   said method further comprising providing a set of allowable types of work items, wherein said work item request indicates a type of the requested work item, wherein said cache comprises a plurality of containers, and wherein said method further comprises storing said information identifying work items of one of said allowable types in a respective container;
   wherein said providing the set of allowable types of work items comprises providing n+1 criteria such that n is at least 2 and further providing a cardinality $C_i$ of criterion i for all integer values i from i=0 through i=n wherein $C_o=1$, wherein $C_i$ is at least 2 for i=1 through i=n, wherein each allowable type of work item is a unique combination of one value of each $C_i$, from i=0 through i=n, and wherein the plurality of containers consist of N containers such that N is a product over $C_i$, from i=0 through i=n.

13. The computer system of claim 12, wherein said piece of information comprises at least one description of a matching work item.

14. The computer system of claim 12, wherein said set of configuration rules comprises at least one of the following:
   a minimum number of work items for which said information is to be stored in each of said containers;
   a maximum number of work items for which said information is to be stored in each of said containers; and
   instructions for a temporal distribution of retrievals of said information from said server.

15. The computer system of claim 14, wherein said maintaining statistics further includes maintaining, for each of said allowable types, at least a rate of work item requests of the respective type as said statistics.

16. The computer system of claim 12, wherein the method further comprises generating a cache selection tree as a hierarchy comprising levels 0, 1, ..., n, n+1, wherein level i comprises $C_i$ nodes representing criteria i for i=0 through i=n, and wherein level n+1 comprises leaf nodes of the tree such that each leaf node at level n+1 is a unique container of the N containers.

* * * * *